United States Patent [19]

Koozer

[11] Patent Number: 5,036,797

[45] Date of Patent: Aug. 6, 1991

[54] ANIMAL HUSBANDRY HOUSING AND METHOD

[76] Inventor: Howard D. Koozer, 2061 Highway 20, Sedro-Woolley, Wash. 98284

[21] Appl. No.: 254,344

[22] Filed: Oct. 5, 1988

Related U.S. Application Data

[63] Continuation-in-part of Ser. No. 844,416, Mar. 26, 1986, abandoned.

[51] Int. Cl.$^5$ ............................................. A01K 1/00
[52] U.S. Cl. .................................................. 119/21
[58] Field of Search ................... 119/16, 19, 21, 17; 98/33.1, 34.5

[56] References Cited

U.S. PATENT DOCUMENTS

| | | | |
|---|---|---|---|
| Re. 12,513 | 7/1906 | Scott | 119/21 |
| 323,782 | 8/1885 | Burgert | 119/21 |
| 2,061,712 | 11/1936 | Martin | 119/17 X |
| 2,257,734 | 10/1941 | Cornell | 119/21 |
| 2,335,173 | 11/1943 | Corey | 119/21 |
| 2,354,292 | 7/1944 | Waterman | 119/16 X |
| 3,000,290 | 9/1961 | Rodick et al. | 98/33.1 |
| 3,062,184 | 11/1962 | Bayer | 119/22 |
| 3,192,901 | 7/1965 | Wolff | 119/17 |
| 3,285,153 | 11/1966 | Hartsough | 98/33.1 |
| 3,389,687 | 6/1968 | Trussell | 119/21 |
| 3,465,722 | 9/1969 | Duff | 119/19 X |
| 3,601,096 | 8/1971 | Rutherford | 119/16 X |
| 3,994,260 | 11/1976 | Fleshman | 119/17 |
| 4,151,811 | 5/1979 | Truhan | 119/21 |
| 4,205,627 | 6/1980 | Buchanan | 119/19 |
| 4,241,871 | 12/1980 | Hewell, III et al. | 236/49 |
| 4,292,927 | 10/1981 | Sassman | 98/33.1 X |
| 4,428,278 | 1/1984 | Sutton, Jr. | 98/33 R |

FOREIGN PATENT DOCUMENTS

| | | | |
|---|---|---|---|
| 2238035 | 7/1973 | Fed. Rep. of Germany | 119/21 |
| 2501037 | 8/1975 | Fed. Rep. of Germany | 119/16 |
| 2636052 | 2/1977 | Fed. Rep. of Germany | 119/16 |
| 55-39216 | 9/1980 | Japan . | |
| 56-2253 | 1/1981 | Japan . | |
| 57-98737 | 6/1982 | Japan . | |
| 60-21646 | 2/1985 | Japan . | |
| 60-38827 | 11/1985 | Japan . | |
| 62-46143 | 2/1987 | Japan . | |
| 1122282 | 11/1984 | U.S.S.R. | 119/17 |
| 1048737 | 11/1986 | United Kingdom | 119/17 |

Primary Examiner—Robert P. Swiatek
Assistant Examiner—Todd E. Manahan
Attorney, Agent, or Firm—Ward Brown; Robert W. Beach

[57] ABSTRACT

Tiers of cages for animals to be raised or tended are disposed in opposing orientation at opposite sides of an elongated room. The tiers are spaced above the floor of the room and inward from the opposite sidewalls. The ceiling of the room has a multiplicity of separate vent apertures spaced apart lengthwise of the room with sliding doors for adjusting the effective open area of the apertures. Exhaust fans are recessed in the ceiling of the room and are effective to expel air from the room to the exterior of the building. Expelling air from the room reduces the pressure and outside fresh air is drawn into the room through the vent apertures. Opening and closing of the vent apertures is coordinated with operation of the exhaust fans so at to maintain a desired negative pressure in the room, which results in fresh air being injected into the room as downward extending jets.

10 Claims, 6 Drawing Sheets

ANIMAL HUSBANDRY HOUSING AND METHOD

CROSS REFERENCE

This application is a continuation-in-part of my co-pending patent application Ser. No. 844,416, filed March 26, 1986, now abandoned for Animal Husbandry Housing and Method, which is expressly incorporated by reference herein.

BACKGROUND OF THE INVENTION

1. Field of the Invention

The present invention relates to housing used in animal husbandry, and particularly to housing adapted for confining small warm-blooded caged animals such as poultry.

2. Prior Art

The structures shown in the U.S. patents discussed briefly below are representative of prior attempts to provide an optimum environment for animal husbandry:

Burgert U.S. Pat. No. 323,782, issued Aug. 4, 1885, discloses a square chicken house having a central top air inlet-outlet and tiers of nesting boards mounted on inclined partitions.

Scott U.S. Pat. No. Re 12,513, reissued July 24, 1906, discloses vertically-spaced tiers of cages mounted at opposite sides of a hollow vertical support.

Cornell U.S. Pat. No. 2,257,734, issued Oct. 7, 1941, discloses a husbandry system in which tiers of cages are moved in a path past feeding, watering and cleaning stations, for example.

Corey U.S. Pat. No. 2,335,173, issued Nov. 23, 1943, discloses a complicated ventilation system for a poultry house having opposing tiers of cages.

Bayer U.S. Pat. No. 3,062,184, issued Nov. 6, 1962, discloses a system for drying manure which has fallen from cages.

Fleshman U.S. Pat. No. 3,994,260, issued Nov. 30, 1976, discloses cages which can be hung from upright columns to form vertically spaced tiers.

Sutton, Jr. U.S. Pat. No. 4,428,278, issued Jan. 31, 1984, discloses mechanism for emergency ventilation of a poultry house.

Truhan U.S. Pat. No. 4,151,811, issued May 1, 1979, discloses a poultry house having a plurality of rooms and mechanism for progressively moving the poultry sequentially through the different rooms.

In general, known husbandry housing for warm-blooded animals has one or more inlets for cool fresh air and one or more outlets for hot stale air. The body heat of the animals contributes to heating the air inside the housing so that, to maintain a given temperature, the ventilation rate is substantially higher in hot weather than in cold weather. A problem with the known housing is that animals near the inlets and animals near the direct airflow path from an inlet to an outlet are exposed to much cooler temperatures than those distant from the inlets and a direct airflow path. This problem is particularly severe in cold weather when the difference in temperature between the cool fresh air and the desired inside temperature is high and the ventilation rate is low.

In addition, in known housings the airflow is interfered with by the interior fixtures and gravity, particularly when the ventilation rate is low, resulting in air stagnation in local areas within the housing. Even if ventilation is positively induced by fans, there can be local microenvironments, some cooled with too much outside air and some hot with dusty air loaded with gases from the animal droppings. These local microenvironments interfere with efficiency of the housing. For example, in the case of a hen house for egg production, productivity of the hens may be reduced.

One known system tries to lessen these problems by locating all of the exhaust openings in one end wall and all of the inlet openings in the opposite end wall. This system lessens the stagnation problem when high ventilation rates are maintained during hot weather, but the temperature of the air in the housing can be much higher at the exhaust end of the room than at the inlet end of the room.

Another known system has inlet vents along the top margins of the sidewalls and exhaust openings in the floor leading to a basement. Air is drawn down through the animal-confining cages to the basement from which it is exhausted to the exterior of the housing. This system can provide a reasonably uniform environment with positive flow through the cages during hot weather but is subject to creation of microenvironments and undesirable stratification during cold weather.

SUMMARY OF THE INVENTION

The principal object of the present invention is to provide improved housing for animal husbandry that economically provides a uniform environment for the animals that can be controlled and maintained automatically, so that there are more nearly optimum conditions conducive to good health, nurturing and growth, while permitting high density of the animals within the improved housing. Preferably, the improved housing is of inexpensive construction using readily available materials and is adapted for use in areas having different weather conditions. The invention is concerned with small warm-blooded animals raised or tended in cages and is particularly useful for raising poultry and/or tending laying hens.

Aspects of the environment in the improved housing in accordance with the present invention which are controlled include:

(1) temperature—the improved housing automatically maintains a desired temperature, substantially uniform throughout the animal-containing portion of the housing, by utilizing the body heat of the animals and by automatically injecting cool fresh air and expelling stale air periodically, but without exposing the animal-containing areas of the housing to undiluted cool air;

(2) cage ventilation—the improved housing inherently provides substantially uniform forced ventilation through each cage during operation of the housing temperature control system;

(3) waste affecting air quality—the improved housing assures quick and uniform drying of manure or droppings so as to prevent unhealthy contamination of the room air such as by build-up of ammonia;

(4) dust affecting air quality—the improved housing provides enhanced removal of dust from the in-house air, thus reducing the risk of respiratory problems in the tended animals;

(5) lighting—without jeopardizing the above desirable aspects of the environment, the improved housing is preferably adaptable to controlled lighting conditions so that it is usable to increase productivity, such as of laying hens by varied lighting schedules, including providing dark periods during daytime hours.

In the preferred animal husbandry housing in accordance with the present invention described in detail below, temperature-actuated exhaust fans expel room air whenever the upper end of a desired temperature range is reached. Expulsion of air reduces the air pressure within the housing. Inlet vent doors are opened to match the number of exhaust fans that are operating, such as when a predetermined negative pressure is exceeded. Because the room is maintained at a negative pressure, fresh air is injected as jets through the inlet vents but does not impinge directly on the animal-containing cages. Rather, the injected fresh air first mixes with room air and passes below the cages before entering an open cage-cooling airflow control channel behind the cages, thus preventing the animals from being exposed to insufficiently diluted fresh air. From the control channel the uniformly diluted air passes outward through the cages toward the inlet air jets. The housing also provides for rapid air movement over the animal droppings to dry the droppings quickly as they are deposited. The abrupt mushrooming of the inlet jet at the floor causes much of the dust in the air to be deposited on the floor. The structure is designed to limit outside light that enters through the exhaust fan or vent apertures.

DETAILED DESCRIPTION

Figure 1:
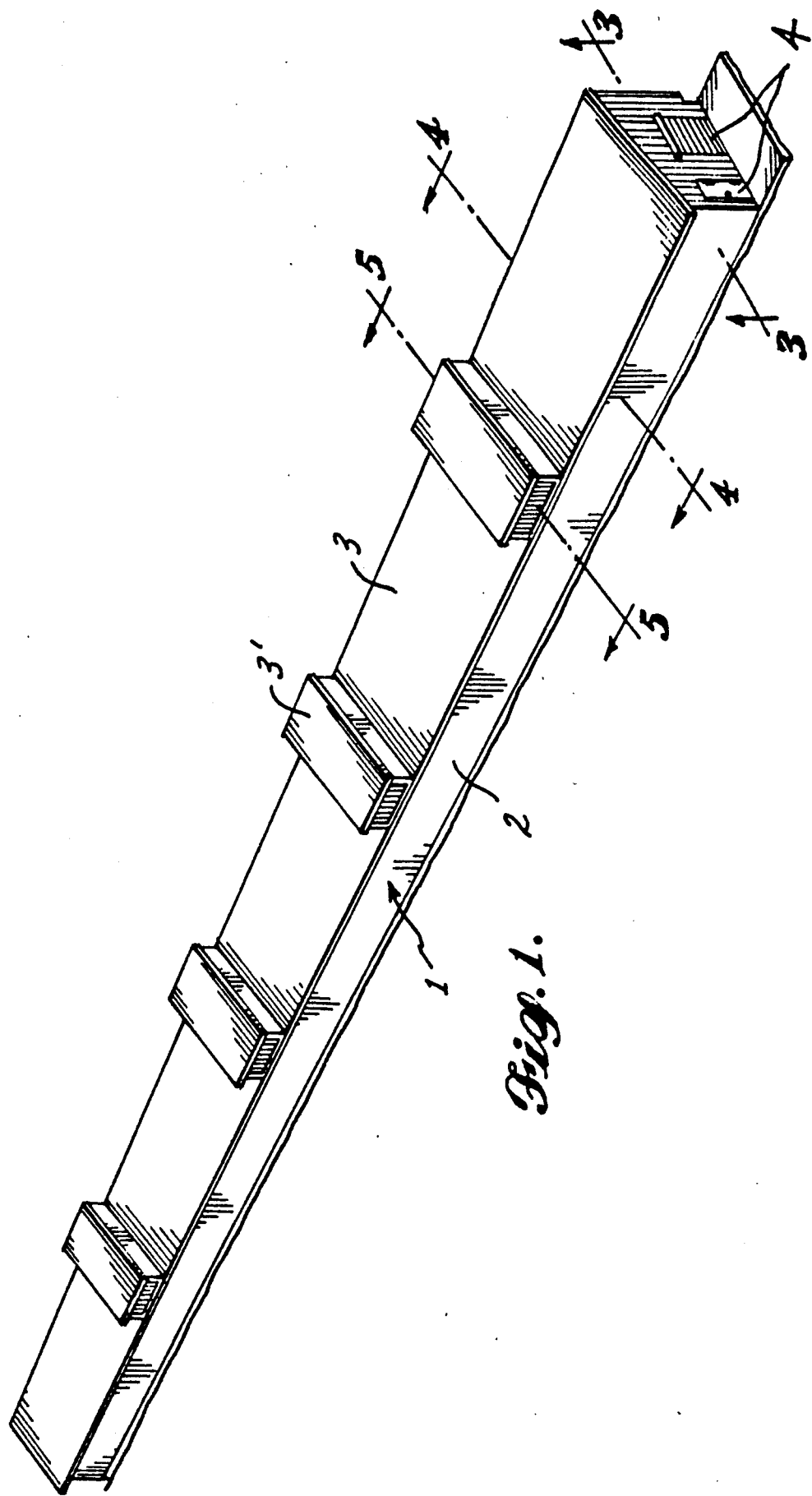
FIG. 1 is a diagrammatic top perspective of animal husbandry housing in accordance with the present invention

As shown in FIG. 1, the preferred animal husbandry housing in accordance with the present invention is an elongated closed building 1 with conventional foundation and framing. The walls 2 and inclined roof 3, including the raised roof portions 3', can have conventional sheet metal siding and roofing, as is commonly used in farm buildings, insulated to prevent condensation within the building and to assist in maintaining a uniform temperature distribution. Preferably there are access doors 4 in both ends, but no windows.

Figure 2:
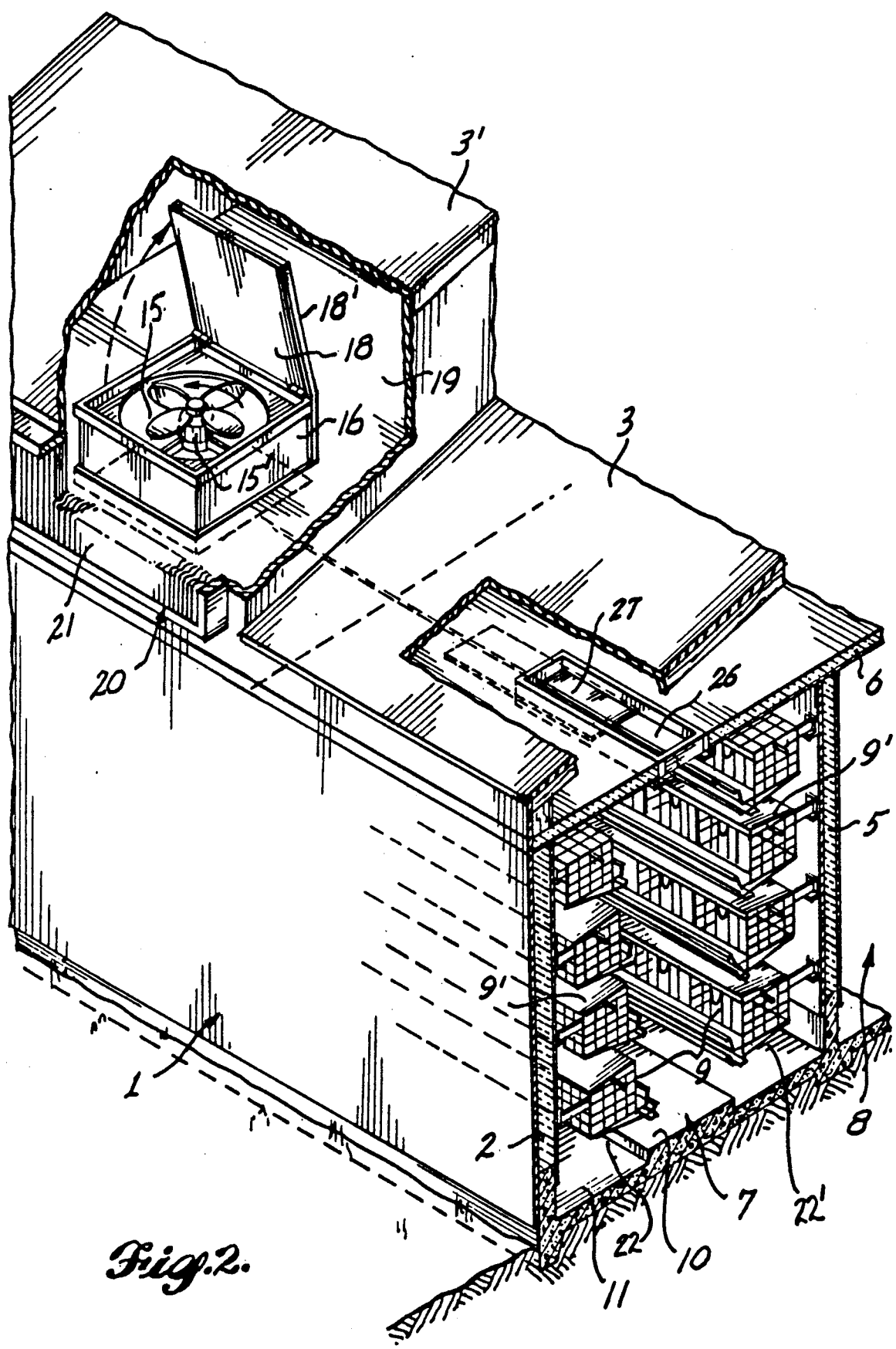
FIG. 2 is a fragmentary top perspective of a portion of the housing of FIG. 1 with parts broken away.
Figure 3:
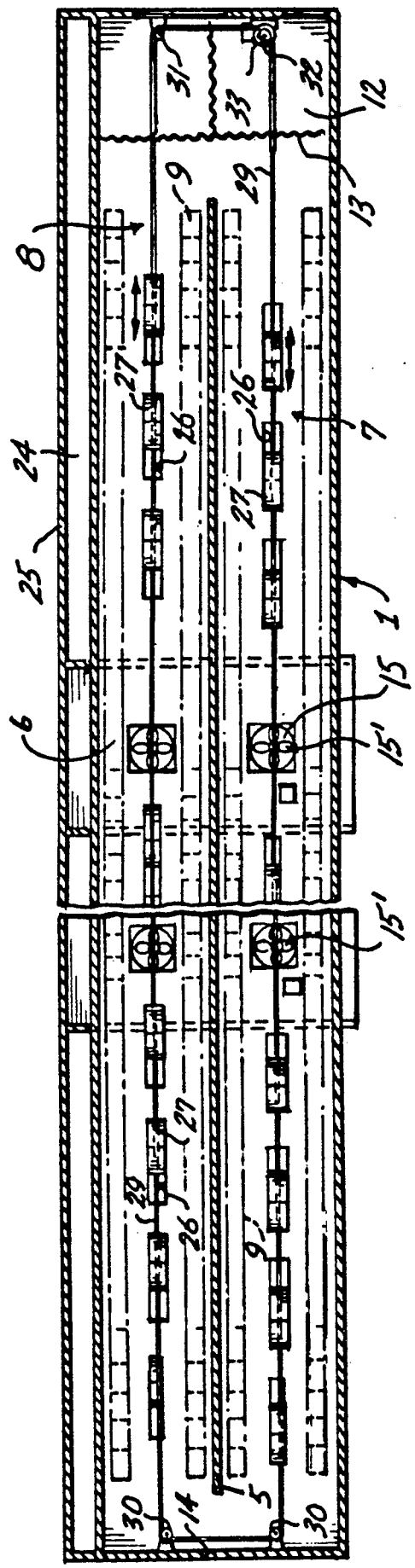
FIG. 3 is a diagrammatic horizontal section along line 3—3 of FIG. 1.
Figure 4:
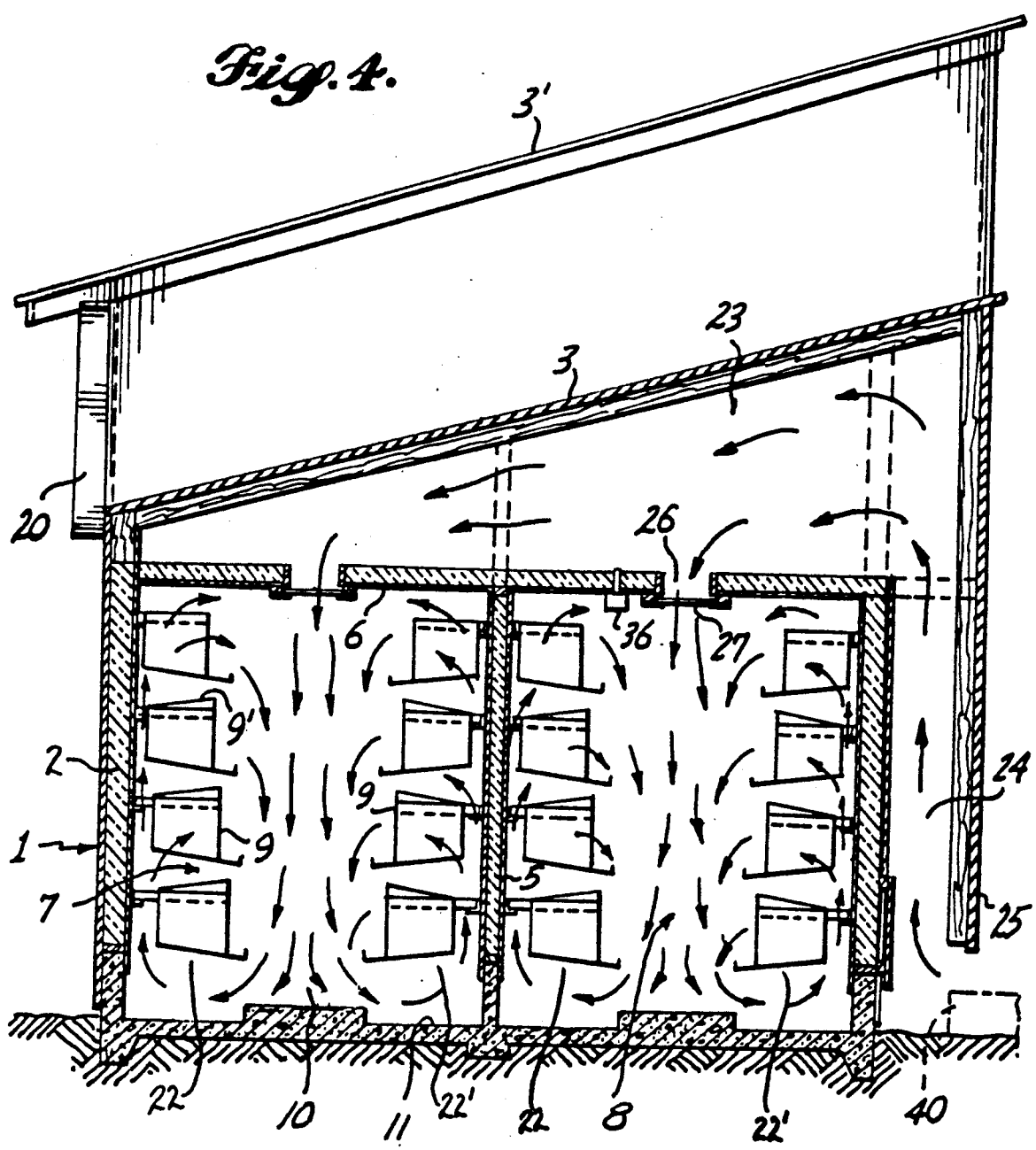
FIG. 4 is a diagrammatic transverse vertical section along line 4—4 of FIG. 1.
Figure 5:
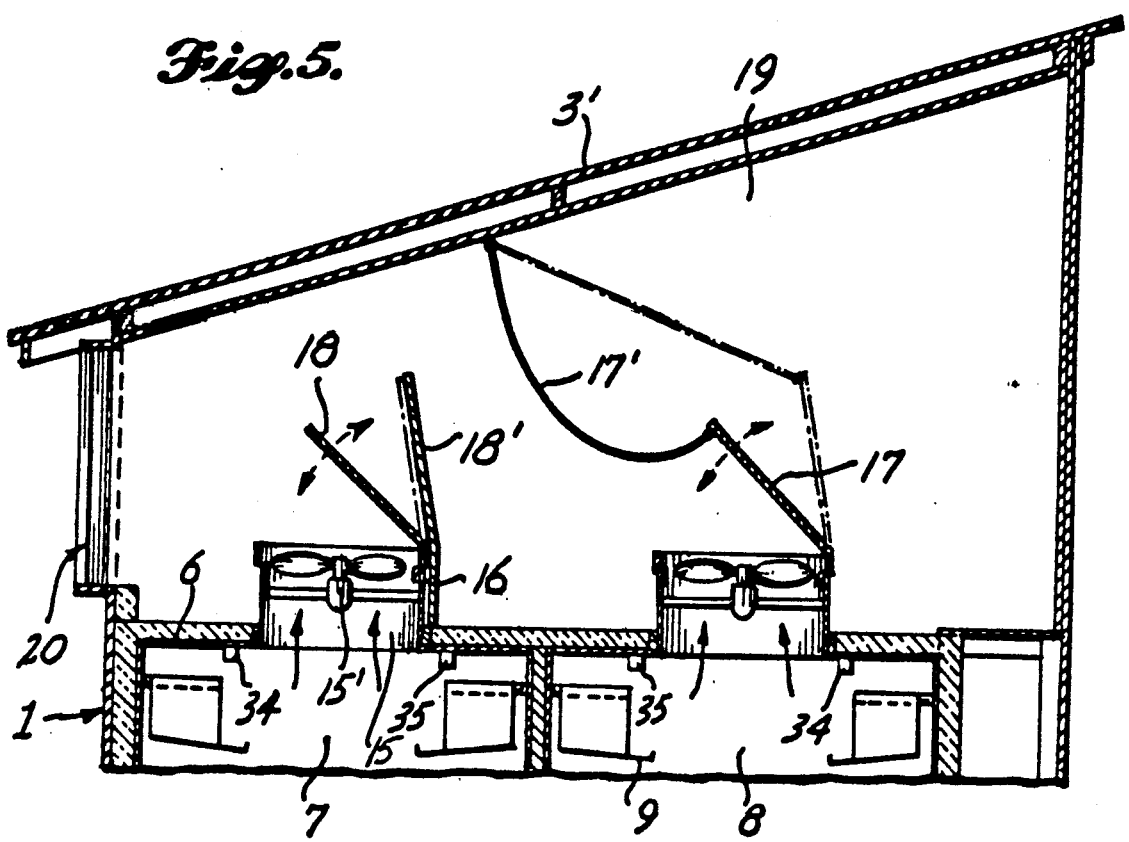
FIG. 5 is a diagrammatic fragmentary vertical section along line 5—5 of FIG. 1.

The building 1 may have a single animal rearing or tending room extending longitudinally of the building or, as seen in FIGS. 2 and 4, a central longitudinally extending wall 5 can divide the building into two elongated rooms 7 and 8. As shown in FIGS. 2, 3 and 5, each room has a horizontal ceiling 6 with exhaust openings 15 equidistantly spaced along the longitudinal central upright plane of the room. As seen in FIGS. 2, 3 and 4, the ceiling 6 of each room also has long rectangular inlet vent openings 26 elongated and substantially evenly spaced along such central plane.

With reference to FIG. 4, two animal rearing areas 22 and 22' for housing warm-blooded animals are defined within each of the rooms 7 and 8 in opposed relation to each other. Each animal-rearing area is located between a vertical plane at the side of a central walkway 10 and the adjacent wall 2 or 5. Within the animal-rearing areas vertically spaced tiers of cages 9 are supported adjacent to the longitudinal walls 2 and 5. The cages are of wire mesh construction having a mesh bottom through which the animal droppings may pass. Each tier of cages except the top tier has a continuous sheet top 9' inclined downward and outward toward the adjacent wall 2 or 5 to prevent the manure from passing into the next lower cages. Preferably, the solid imperforate floor 11 of each room is raised in the area of the central walkway 10 between the opposing tiers of cages.

The general layout of the building is best seen in FIG. 3, 4 and 5. The dimensions can vary through a wide range to meet the needs of a particular installation but in the representative embodiment shown the inside dimensions of each room are about 260 feet by about 8 feet with the ceiling 6 about 9½ feet above the floor. Two such rooms are sufficient to accommodate about 16,000 laying hens, 1,000 for each of the 16 tiers. At one end of the building there is a service and storage room 12 separated from the cage-containing rooms 7 and 8 by an opaque curtain 13 or by a wall. The far end of the central partition or wall 5 can be spaced inward from the far end wall 14 of the building. There is cross ventilation between the two rooms at both ends.

In each of the rooms there are high-volume exhaust fans 15' mounted adjacent to the exhaust openings 15 in rectangular frames 16. Such frames are recessed in the ceiling and registered with the raised sections 3' of the roof. In the representative embodiment shown, the raised roof sections are evenly distributed along the length of the building on 60-foot centers with the endmost sections being spaced about one-half that distance from the adjacent ends of the cage-containing rooms. Each raised section 3' is about 12 feet long and about 5 feet higher than the longer, lower sections of the roof 3. The raised sections are sealed from the remainder of the attic to form exhaust plenums 19 that communicate with the exterior of the building only through the large exhaust openings 20 at one side of the building.

Each of the frames 16 has a light-weight, insulated door 17 or 18 pivotally mounted at the top. The doors 17 and 18 are normally closed to seal the room below from the plenums 19. When a fan is actuated its door is blown open. As seen in FIG. 5, for the fans remote from the exhaust openings 20, opening of the doors 17 is limited by cords 17' connected between the swinging ends of the doors and the roof 3'. The frames 16 for the fans at the other side of the building—adjacent to the openings 20—have stationary inclined deflector plates 18' at the inner sides of the frames to prevent air blown by the other fans from interfering with opening of the doors 18 The deflector plates also limit opening of the doors 18 so that no cords are required.

As seen in FIG. 2, to minimize the light entering through the exhaust openings 20 and into the rooms when one or more of the exhaust fans are running—which would interfere with varied lighting schedules requiring darkness during daylight hours—a conventional light trap panel 21 can be used, such as the panel available from Acme Engineering and Manufacturing Corp. of Muskogee, Oklahoma. Such panels have closely spaced upright blinds of serpentine cross section to limit entry of light without unduly interfering with the passage of air between the blinds.

As best seen in FIG. 4, between the raised roof sections 3' which form the exhaust plenums, the attic area 23 above the horizontal ceiling 6 is in communication with the exterior of the building by way of a continuous inlet air plenum 24 formed between a double outer wall along one side of the building. The bottom of the outermost wall or baffle 25 is spaced above the ground and extends upward to the roof. In the representative embodiment the inlet air plenum is about 2 feet wide and the underside of the roof 3 forming the top of the attic 23 slopes from 1½ feet above the ceiling 6 at the low side of the roof to about 8 feet above the ceiling at the high side of the roof.

Figure 7:
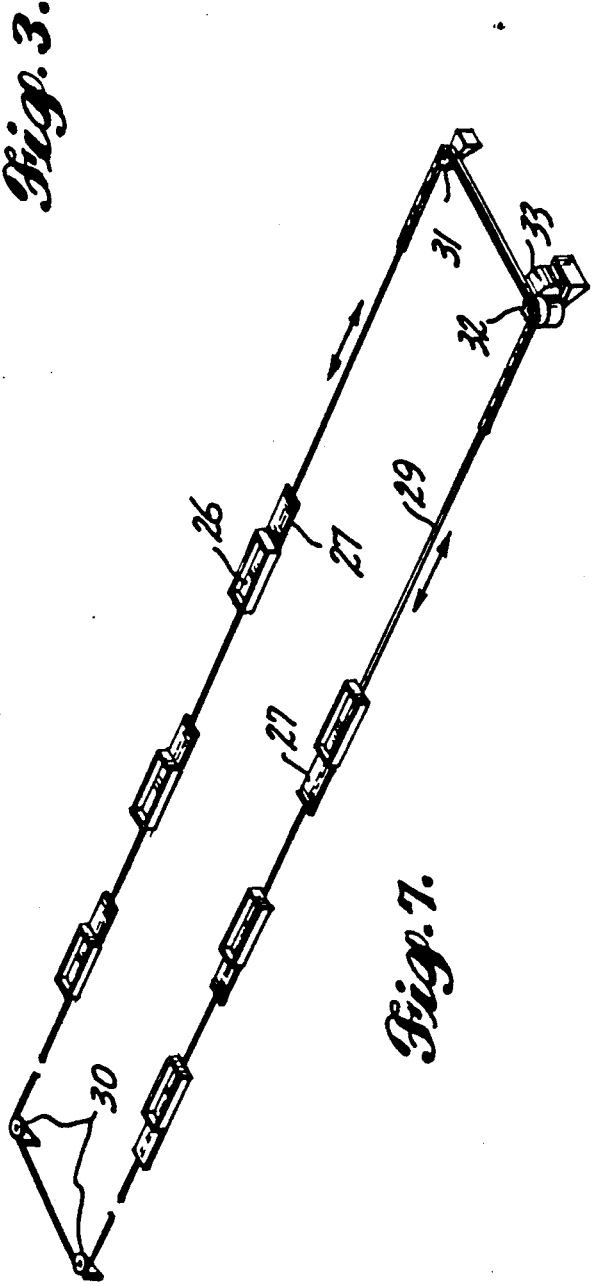
FIG. 7 (on the drawing sheet with FIG. 3) is a schematic representation of the mechanism for opening the vent doors.
Figure 6:
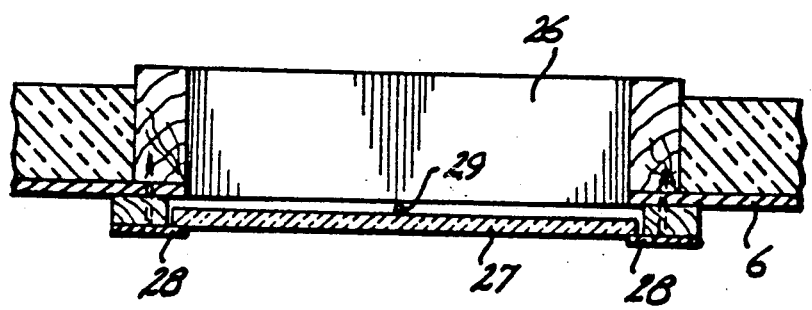
FIG. 6 (on the drawing sheet with FIG. 4) is a fragmentary, enlarged, detail end elevation of a portion of the interior of the housing, namely, one of the vent doors and its surrounding structure, with parts shown in section.

As introduced previously, the ceiling 6 of each room has narrow vent openings or apertures 26 each elongated lengthwise of its room, and such vent apertures are evenly spaced along the central upright plane of each room in the sections below the attic vent area 23. The effective size of each vent aperture 26 is adjusted by sliding a door 27 which, as seen in FIG. 6, has its opposite longitudinal margins resting on inward-projecting lips 28 supported from the ceiling 6. In a representative installation, the vent apertures are about 13 inches wide by about 48 inches long and are spaced on 96-inch centers, that is, as close together as possible so that a door in its full open position does not obstruct an adjacent aperture As best seen in FIGS. 3 and 7, a single continuous cable 29 extends lengthwise through one of the rooms close to the ceiling and is attached to each of the vent doors 27 in that room, then around pulleys 30 at the far end wall 14 and back through the other room where it is secured to each of the vent doors in that room. At the near end of the building the cable extends around another pulley 31 to a sprocket 32 driven by a motor 33. The motor can be actuated to slide all of the doors simultaneously so as to enlarge or lessen the effective open areas of all of the vent apertures to the same extent. The rooms are substantially sealed from outside air when the vent doors are in their closed positions.

For moderate temperatures between about minus 10° F. and about 80° F. operation of the exhaust fans 15 and the motor 33 controlling the positions of the vent doors 27 is coordinated to maintain a substantially constant temperature in the rooms 7 and 8. For tending laying hens, such temperature would be within the range of about 70 degrees F. to about 80 degrees F. Each of the exhaust fans can have a temperature sensor diagrammatically represented at 34 in FIG. 5 which actuates its fan to exhaust air from the upper portion of the room if a temperature slightly in excess of the desired temperature is sensed and turns off its fan if a temperature slightly less than the predetermined temperature is sensed. In a representative embodiment the temperature sensor actuates its fan as required to maintain the temperature at 80° F. plus or minus 0.4° F. Preferably each fan is actuated independently of the other fans. Also, in case of a malfunction in the sensing equipment or one or more fans, preferably there is a temperature sensor 35 located centrally of each room which will actuate all of the fans if a temperature approaching a dangerous temperature is reached. For laying hens the emergency temperature for actuation of all fans could be 95° F.

Opening of the vent doors 27 is coordinated with operation of the exhaust fans so that the desired velocity of inlet air jets through the vent apertures 26 is maintained. One way in which this can be accomplished is by use of a differential pressure sensor 36 diagrammatically illustrated in FIG. 4 which measures the difference in pressure between one of the rooms and the low attic area above that room. Such differential pressure sensor can control the motor 33 for opening and closing the vent doors to maintain the negative pressure between predetermined limits of 0.01 to 0.03 inches of water less than outside pressure. In a representative embodiment the motor is not actuated, that is, the doors are maintained in their then existing positions, if the pressure in the room is between about 0.01 inches of water and about 0.03 inches of water below the attic pressure. If the pressure difference is less than about 0.01 inches of water the motor is actuated to begin closing the doors, and if the pressure difference is greater than about 0.03 inches of water the motor is actuated to begin opening the doors. In the illustrated embodiment there is cross ventilation between the room 7 and 8 at both ends of the rooms and all doors are moved simultaneously and to the same extent. For a room length greater than about 450 feet or if it is desired to manage the rooms as separate flocks, the doors within each room should be actuated independently of the doors of each of the other rooms and the rooms would be substantially sealed from each other, although they can share the common attic and the common exhaust plenums. Separate controls would be required for each room.

Another method for maintaining the negative pressure between predetermined limits so as to achieve the desired velocity of the inlet air jets would be by a control system that sets the vent doors 27 at predetermined points as a function of the number of fans in operation.

Figure 4A:
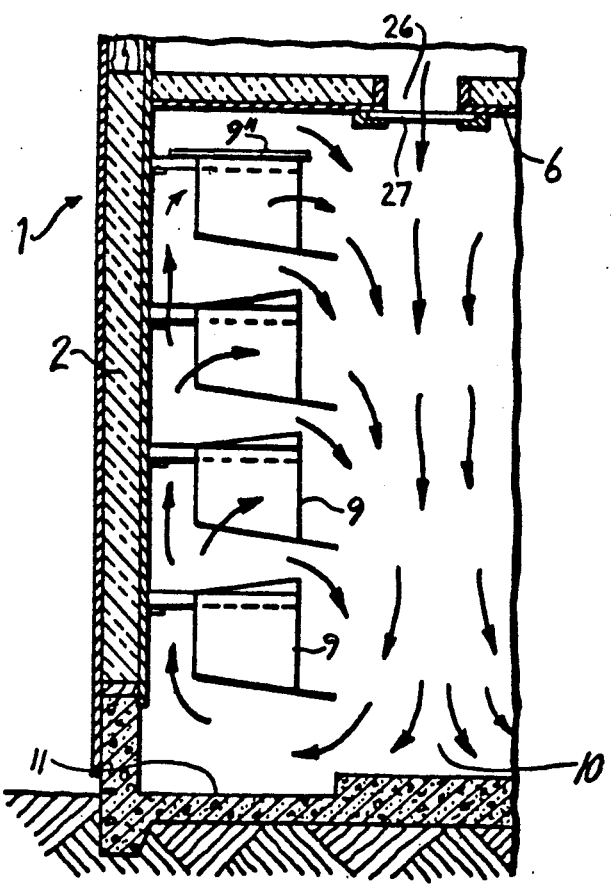
FIG. 4a is a corresponding transverse vertical section illustrating a modified form of animal husbandry housing in accordance with the present invention.

The air circulation pattern with the vent doors 27 open or partially open is indicated by the arrows in FIG. 4. The beneficial aspects of maintaining room pressure below attic pressure and of locating the vent doors centrally in the rooms is that undiluted fresh air is injected into the rooms as jets which have sufficient momentum that the jets flow substantially straight down between the opposing animal-rearing areas 22 and 22' until the jets are turned abruptly toward the walls 2 and 5 of the room at the floor of the walkway 10. Since the air in the inlet jets is cooler than the room air, gravity accelerates the jets downward and helps keep the flow centered in the walkway, thus preventing any of the cold outside air from impinging upon the cages 9 within the animal-rearing areas. As the jets travel to the floor, some room air is incorporated into the jets. As the result of the abrupt direction change at the walkway floor, considerable turbulence is induced in the jets as they flow under the bottom cages 9 which are spaced a substantial distance above the floor 11 to form an unobstructed airflow passage below the cages. The turbulence completes the mixing of the inlet air with room air in the passage below the cages before the flow enters the space behind the cages. The cages are spaced inward from the side walls 2 and 5 to form an upright airflow passage or channel to control the distribution of the mixed air to the back sides of the cages. Such channel is referred to as the cage-cooling airflow control channel. The momentum of the inlet jets forces the mixed air into the cage-cooling airflow control channel at a pressure that is slightly higher than the pressure at the walkway side of the corresponding animal-rearing area 22 or 22'. The differential pressure provides positive forced ventilation with air that is uniform in temperature for each and every cage in the building As seen in FIG. 4, each higher tier may be uniformly set back closer to the adjacent walls 2 or 5 or, as shown in FIG. 4a, the cages can be registered vertically and a horizontal baffle board 9" at the top of the cage-cooling airflow control channel can extend over the top tier of cages. In either case, the airflow rates through the separate tiers of cages preferably are approximately uniform As the cage-cooling air re-enters the walkway, somewhat warmed by the body heat of the animals, it is drawn back into the inlet jets, thus setting up a circular airflow pattern. In addition to the circular flow pattern there is longitudinal movement of the room air toward the operating exhaust fan(s). A given air molecule may make a number of circular cycles as it drifts to an exhaust fan.

Another inherent feature of the invention is that as the house cooling flow rate is increased during warming outside temperatures, smaller percentages of in-house air will be mixed into the inlet jets. At maximum cooling rates the cage-cooling air temperature will be close to the inlet air temperature.

The airflow pattern provides rapid air movement over the animal droppings that collect on the boards 9' and floor 11 which accelerates their drying. The drying of the droppings is important because it greatly reduces the release of undesirable gases.

Another beneficial aspect of this preferred airflow pattern is that the abrupt turning of the jets at the floor of the walkway 10 causes a substantial portion of the airborne dust to be deposited on the floor. The resulting cleaner air is better for the respiratory systems of the animals and the service personnel. Also this cleaning makes it unnecessary to overcool the animals to reduce the dust level in the air. Since warm-blooded animals require more feed when the air temperatures are lower, the feed cost during times when the animals are producing large amounts of dust is reduced.

A secondary benefit of the airflow pattern is that the inlet jets are cooler than the general room temperature resulting in an improvement in the comfort of the service personnel in the walkway 10.

One of the critical design considerations is the open area of an individual inlet vent opening 26 with only a single fan 15' running. The area must be large enough to produce a jet that is large enough to force the mixed air up into the cage-cooling airflow control channel and thus energize the desired circular airflow pattern. Since the width of the inlet vent openings is selected to provide sufficient inlet vent area with all the fans running (vent doors full open), the number of inlet vent openings is selected to provide the required minimum opening of the inlet vents when the flow of one fan is matched. If the number of inlet vent openings is too large the individual openings would be so small that the inlet jets would not penetrate all the way to the walkway floor when the vent doors 27 are open to match the flow of one fan. For a given size and spacing of the inlet vent openings 26 the differential pressure range may be adjusted to fine tune the airflow pattern. Too little pressure difference between the room and the attic results in the dissipation of the jets before they reach the walkway floor, whereas too great a pressure difference can degrade the uniformity of temperature of the cage-cooling air.

The upright inlet plenum 24 conducts air into the attic area 23 from close to the ground, assuring that the coldest possible air is supplied into the rooms. In the northern hemisphere, preferably the building is oriented with the inlet plenum on the shadier northern side. The long upright inlet plenum 24 also limits the amount of light introduced into the rooms when the vent doors are opened. Preferably the inlet plenum and the exhaust openings 20 are located on opposite sides of the building to minimize recirculation of exhausted stale room air back into the inlet plenum.

For laying hens the capacity of the exhaust fans is selected so that with all fans running the air circulation is at least 5 cubic feet per hen per minute to assure sufficient cooling in warm weather. For outside temperatures below about minus 10° F. some supplemental heating may be required. For sustained outside temperatures above about 85° F. some supplemental cooling may be required. As seen in FIG. 4, supplemental cooling can be accomplished by evaporative cooling pads 40 at the fresh air inlet below the outer wall or baffle 25.

Figure 8:
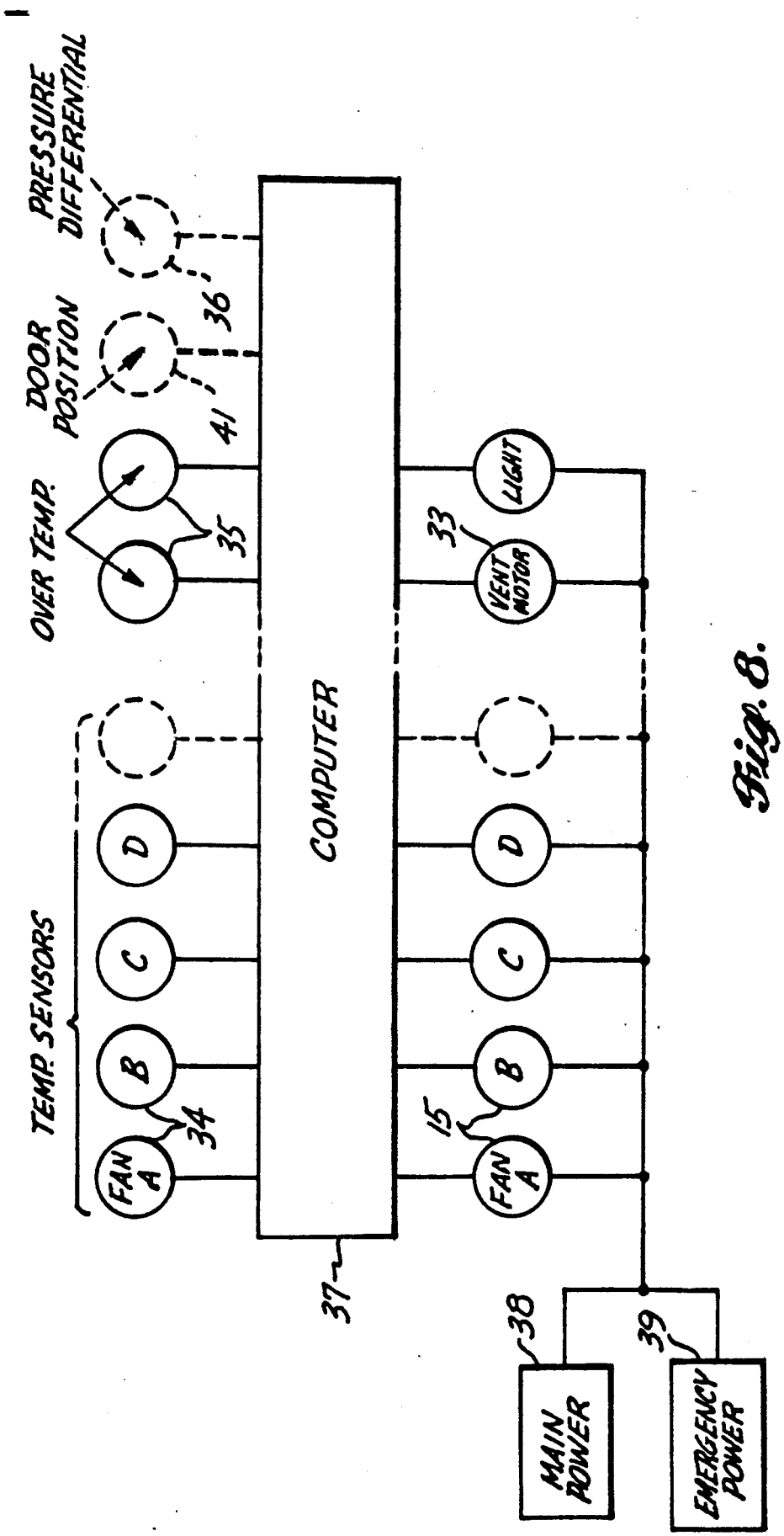
FIG. 8 is a schematic diagram of the exhaust fan, ventilation and lighting control system that can be used with the housing of FIG. 1.

The improved housing in accordance with the present invention is adaptable to automatic control by computer as diagrammatically represented in FIG. 8. The separate temperature sensors 34 for the exhaust fans 15' can be connected to a computer 37 which monitors the temperature in the area of each fan. The computer can monitor the differential pressure and control the vent door motor 33 accordingly, and also can monitor an emergency over temperature condition by use of the auxiliary temperature sensors 35 mounted centrally of each room. In addition to a primary or main power source 38 there should be an auxiliary or emergency power source 39 in case of failure of the main source. Otherwise, considering the high density of the animals being raised or tended, even a fairly short power outage could cause substantial damage. The computer also can control the building lighting as well as any other automatic equipment.

For an alternative control system tests could be conducted to determine the required positions of the vent doors depending on the number of fans that are running and the desired pressure difference between the rooms and the attic. The computer 37 could monitor the position of the doors as diagrammatically indicated at 1 in FIG. 8 and be programmed to actuate the vent door motor or motors to position the doors in predetermined positions as a function of actuation of the fans. For example, tests of an embodiment approximately corresponding to the embodiment shown in the drawings have established that the doors open approximately 2 inches with one fan running and progressively greater but substantially constant distances for each additional fan in operation.

Regardless of the details of the control system used, the improved housing in accordance with the present invention provides a uniform temperature environment for the animals being raised or tended with excellent air quality and in a form adaptable to advanced automated equipment and modern management techniques.

I claim:

1. An animal husbandry housing including a substantially closed building having an elongated room with solid, substantially air-impervious upright sidewalls, a generally horizontal ceiling and a floor, perforate cages for the animals mounted adjacent to at least one of the sidewalls but spaced outward therefrom and above the floor so as to leave a substantially unobstructed airflow passage between such at least one adjacent sidewall and the cages and below the cages above the floor, the ceiling having a multiplicity of separate vent apertures spaced apart lengthwise of the room, the room normally being in communicating with the exterior of the building by means of the ceiling vent apertures, an exhaust opening in the upper portion of the room, and fan means for expelling air from the room through the exhaust opening so as to draw undiluted fresh air from the exterior of the building into the room through the ceiling vent apertures, the improvement comprising the cages being positioned between the ceiling vent apertures and such at least one adjacent sidewall such that there is an unobstructed airflow passage from the vent apertures downward to the floor at the side of the cages remote from such at least one adjacent sidewall and in open communication with the passage below the cages, vent door means for closing and opening the ceiling vent apertures, and means for coordinating opening and closing of said vent door means with operation of the fan means so as to maintain the room at a negative pressure sufficient that undiluted fresh air is injected into the room as jets through the ceiling vent apertures which jets are out of registration with the cages.

2. In the housing defined in claim 1, the coordinating means maintaining the room at a negative pressure sufficient that the jets of undiluted fresh air injected into the room through the ceiling vent apertures flow substantially straight down at the side of the cages remote from the at least one adjacent sidewall until the jets are turned abruptly at the floor for mixing of the injected air with room air adjacent to the floor prior to flow into the airflow passage between such at least one adjacent sidewall and the cages.

3. In the housing defined in claim 1, the cages being arranged in tiers, each tier of cages below the top tier being spaced outward from the at least one adjacent sidewall a distance greater than the tier above it such that the width of the passage behind the cages tapers upward to meter the volume of airflow to be approximately uniform through the different tiers of cages.

4. An animal husbandry housing including a substantially closed building having an elongated room with solid, substantially air-impervious upright sidewalls, a generally horizontal ceiling and a floor, perforate cages for the animals mounted adjacent to at least one of the sidewalls but spaced outward therefrom and above the floor so as to leave a substantially unobstructed airflow passage between such at least one adjacent sidewall and the cages and below the cages above the floor, the ceiling having a multiplicity of separate vent apertures spaced apart lengthwise of the room, the room normally being in communication with the exterior of the building by means of the ceiling vent apertures, an exhaust opening in the upper portion of the room, and fan means for expelling air from the room through the exhaust opening so as to draw air from the exterior of the building into the room through the ceiling vent apertures, the improvement comprising the cages being positioned between the ceiling vent apertures and such at least one adjacent sidewall such that there is an unobstructed airflow passage from the vent apertures downward to the floor at the side of the cages remote from such at least one adjacent sidewall and in open communication with the passage below the cages, vent door means for closing and opening the ceiling vent apertures, means for coordinating opening and closing of said vent door means with operation of the fan means so as to maintain the room at a negative pressure sufficient that air is injected into the room as jets through the ceiling vent apertures which jets are out of registration with the cages, an exhaust plenum above the ceiling and communicable with the room through said exhaust opening, and an inlet plenum separate from said exhaust plenum, above the ceiling and communicable with the room through the vent apertures, said exhaust plenum being open to ambient air at one side of the building and said inlet plenum being open to ambient air at the opposite side of the building to deter recirculation of air from said exhaust plenum to said inlet plenum.

5. An animal husbandry housing including a substantially closed building having an elongated room with solid, substantially air-impervious upright sidewalls, a generally horizontal ceiling and a floor, perforate cages for the animals mounted adjacent to at least one of the sidewalls but spaced outward therefrom and above the floor so as to leave a substantially unobstructed passage between such at least one adjacent sidewall and the cages and below the cages above the floor, the ceiling having a multiplicity of separate vent apertures spaced apart lengthwise of the room, the room normally being in communication with the exterior of the building by means of the ceiling vent apertures, an exhaust opening in the upper portion of the room, and fan means for expelling air from the room through the exhaust opening so as to draw air from the exterior of the building into the room through the ceiling vent apertures, the improvement comprising the cages being positioned between the ceiling vent apertures and such at least one adjacent sidewall such that there is an unobstructed airflow passage from the vent apertures downward to the floor at the side o the cages remote from such at least one adjacent sidewall and in open communication with the passage below the cages, vent door means for closing and opening the ceiling vent apertures, and means for coordinating opening and closing of said vent door means with operation of the fan means so as to maintain the room at a negative pressure sufficient that air is injected into the room as jets through the ceiling vent apertures which jets are out of registration with the cages, the vent apertures being elongated lengthwise of the room, each of said apertures being at least several times longer than it is wide, said vent door means including an elongated door for each aperture having opposite ends adjacent to the opposite ends of the corresponding aperture, respectively, said coordinating means including means for sliding said doors lengthwise of the vent apertures to alter the distance between corresponding ends of said doors and apertures and thereby adjust the unobstructed areas of the apertures opening downward toward the floor.

6. In the housing defined in claim 5, the coordinating means including means for adjusting the effective open areas of all of the vent apertures simultaneously and to the same extent by simultaneous and equal movement of the vent doors.

7. A method of introducing undiluted outside fresh air into animal husbandry housing having an elongated room with substantially air-impervious upright sidewalls, a generally horizontal ceiling, a floor and perforate cages for the animals adjacent to at least one of the sidewalls but spaced outward therefrom and upward from the floor forming an unobstructed upright airflow passage between such at least one sidewall and such cages and a lower unobstructed airflow passage in communication with such upright passage, which method comprises expelling air from the room through an exhaust opening so as to draw undiluted outside fresh air through vent apertures out of registration with the cages, and coordinating opening and closing of the vent apertures with the expelling of air from the room so as to maintain the room at a negative pressure sufficient that undiluted outside fresh air is injected into the room as jets through the ceiling vent apertures which jets are out of registration with the cages.

8. The method defined in claim 7, including coordinating opening and closing of the vent apertures with the expelling of air from the room so as to maintain the room at a negative pressure sufficient that the jets pass down at the side of the cages remote from the adjacent sidewall until the jets are turned abruptly at the floor for mixing of the outside fresh air with room air adjacent to the floor prior to flow into the upright passage between the adjacent sidewall and the cages.

9. An animal husbandry housing, the improvement comprising the combination of a substantially closed building having an elongated room with solid, substantially air-impervious upright sidewalls, a generally horizontal ceiling and a floor, two animal rearing areas arranged in opposing orientation adjacent to said sidewalls at opposite sides of said room, respectively, and spaced apart transversely of said room leaving an unobstructed central service walkway therebetween, each of said animal rearing areas having a plurality of vertically spaced tiers of perforate cages for the animals, which cages have back sides adjacent to, but spaced outward from, the adjacent sidewall so as to leave a substantially unobstructed upright cage-cooling airflow control channel between such adjacent sidewall and the back sides of the cages and front sides remote from such adjacent sidewall and facing the front sides of the cages in the animal rearing area at the opposite side of the room, said cages being spaced above said floor so as to leave a substantially unobstructed bottom airflow passage below said cages in each animal rearing area, which bottom airflow passage is in open communication with the corresponding upright cage-cooling airflow control channel, said ceiling having a multiplicity of separate vent apertures spaced apart lengthwise of said room, said room normally being in communication with the exterior of said building by means of said ceiling vent apertures, each of said animal rearing areas and the corresponding tiers of cages being positioned between said ceiling vent apertures and the adjacent sidewall such that there is an unobstructed airflow passage through said central service walkway from said vent apertures downward to said floor out of registration with said cages between said animal rearing areas and in open communication with said bottom airflow passages below said cages, an exhaust opening in the upper portion of said room, fan means for expelling air from said room through said exhaust opening so as to draw undiluted fresh air from the exterior of said building into said room through said ceiling vent apertures, vent door means for closing and opening said ceiling vent apertures, and means for coordinating opening and closing of said vent door means with operation of said fan means so as to maintain the room at a negative pressure sufficient that undiluted fresh air is injected downward into the room as jets through said ceiling vent apertures, which jets are out of registration with said tiers of cages, with sufficient momentum that said jets flow through said walkway and are turned abruptly at said floor of mixing with air inside said room in the area of said floor, whereby a mixture of fresh air and room air is forced outward toward said sidewalls through said bottom airflow passages, then upward through the control channels and inward away from said sidewalls through said perforate cages for ventilating said cages.

10. In the housing defined in claim 9, each tier of cages below the top tier of each animal rearing area being spaced outward from the adjacent sidewall a distance greater than the tier above it such that the width of the cagecooling airflow control channel behind the cages tapers upward to meter the volume of airflow to be approximately uniform through the different tiers of cages.

* * * * *